(12) United States Patent
Yuk et al.

(10) Patent No.: US 7,269,555 B2
(45) Date of Patent: Sep. 11, 2007

(54) UNSUPERVISED INCREMENTAL ADAPTATION USING MAXIMUM LIKELIHOOD SPECTRAL TRANSFORMATION

(75) Inventors: Dongsuk Yuk, Seoul (KR); David M. Lubensky, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/215,415

(22) Filed: Aug. 30, 2005

(65) Prior Publication Data

US 2006/0009972 A1 Jan. 12, 2006

Related U.S. Application Data

(63) Continuation of application No. 09/910,985, filed on Jul. 23, 2001, now Pat. No. 6,999,926.

(60) Provisional application No. 60/249,332, filed on Nov. 16, 2000.

(51) Int. Cl.
*G10L 15/00* (2006.01)

(52) U.S. Cl. .................. 704/234; 704/222; 704/244

(58) Field of Classification Search ............... 704/245, 704/222, 244, 234
See application file for complete search history.

(56) References Cited

U.S. PATENT DOCUMENTS

| | | | | |
|---|---|---|---|---|
| 4,817,156 A | * | 3/1989 | Bahl et al. ............... 704/256.2 |
| 5,230,037 A | * | 7/1993 | Giustiniani et al. ......... 704/200 |
| 5,625,749 A | * | 4/1997 | Goldenthal et al. ......... 704/254 |
| 5,937,384 A | * | 8/1999 | Huang et al. ............... 704/256 |
| 6,006,175 A | * | 12/1999 | Holzrichter ................. 704/208 |
| 6,188,982 B1 | * | 2/2001 | Chiang .................... 704/256.5 |
| 6,202,047 B1 | * | 3/2001 | Ephraim et al. ......... 704/256.6 |
| 6,236,962 B1 | * | 5/2001 | Kosaka et al. ............. 704/234 |
| 6,381,569 B1 | * | 4/2002 | Sih et al. .................... 704/233 |
| 6,389,393 B1 | * | 5/2002 | Gong ........................ 704/244 |
| 6,539,352 B1 | * | 3/2003 | Sharma et al. ............. 704/249 |
| 6,625,587 B1 | * | 9/2003 | Erten et al. .................. 706/22 |
| 6,760,701 B2 | * | 7/2004 | Sharma et al. ............. 704/249 |

OTHER PUBLICATIONS

Ephraim, Y.; Rahim, M.; "On second-order statistics and linear estimation of cepstral coefficients",□□Speech and Audio Processing, IEEE Transactions on□□vol. 7, Issue 2, Mar. 1999 pp. 162-176 □□.*

(Continued)

*Primary Examiner*—Michael N. Opsasnick
(74) *Attorney, Agent, or Firm*—Anne V. Dougherty; Ryan, Mason & Lewis, LLP

(57) ABSTRACT

In a speech recognition system, a method of transforming speech feature vectors associated with speech data provided to the speech recognition system includes the steps of receiving likelihood of utterance information corresponding to a previous feature vector transformation, estimating one or more transformation parameters based, at least in part, on the likelihood of utterance information corresponding to a previous feature vector transformation, and transforming a current feature vector based on maximum likelihood criteria and/or the estimated transformation parameters, the transformation being performed in a linear spectral domain. The step of estimating the one or more transformation parameters includes the step of estimating convolutional noise $N_i^\alpha$ and additive noise $N_i^\beta$ for each ith component of a speech vector corresponding to the speech data provided to the speech recognition system.

15 Claims, 3 Drawing Sheets

OTHER PUBLICATIONS

C.J. Leggetter et al. entitled "Speaker Adaptation of Continuous Denisty HMMs Using Multivariate Linear Regression," *International Conference on Spoken Language Processing*, pp. 451-454 (1994).

D. Yuk et al. entitled "Adaptation to Environment and Speaker Using Maximum Likelihood Neural Networks," *Eurospeech*, pp. 2531-2534 (Sep. 1999).

L.E. Baum entitled "An Inequality and Associated Maximization Technique in Statistical Estimation for Probabilistic Functions of Markov Processes," *Inequalitites*, Chapter 3, pp. 1-8 (1972).

G.D. Forney, Jr. entitled "The Viterbi Algorithm," *Proceedings of the IEEE*, vol. 61, No. 3, pp. 268-278 (Mar. 1973).

S. Furui entitled "Cepstral Analysis Technique for Automatic Speaker Verification," *IEEE Transactions on Acoustics, Speech and Signal Processing*, ASSP-29(2), pp. 254-272, Sep. 1996.

\* cited by examiner

| MODE | ERROR RATE (%) | REDUCTION RATE (%) |
|---|---|---|
| BASELINE | 28.1 | N/A |
| ENVIRONMENT | 26.6 | 5.3 |
| TWO-PASS | 22.3 | 20.6 |
| SPEAKER | 19.8 | 29.5 |

UNSUPERVISED INCREMENTAL ADAPTATION USING MAXIMUM LIKELIHOOD SPECTRAL TRANSFORMATION

CROSS-REFERENCE TO RELATED APPLICATION(S)

This application is a continuation of U.S. application Ser. No. 09/910,985 filed on Jul. 23, 2001, which issued as U.S. Pat. No. 6,999,926 on Feb. 14, 2006, and which claims the benefit of U.S. Provisional Application Ser. No. 60/249,332 filed on Nov. 16, 2000, the disclosures of which are incorporated herein by reference.

FIELD OF THE INVENTION

The present invention relates generally to speech recognition systems and, more particularly, to techniques for performing rapid unsupervised adaptation using maximum likelihood criteria.

BACKGROUND OF THE INVENTION

While conventional speech recognizers based on hidden Markov models (HMMs) show a high level of performance in matched training and testing conditions, the accuracy of such speech recognizers typically drops significantly when used under unknown operating environments. Some types of speaker or environment adaptation schemes are usually used to combat this degradation. Obtaining adaptation data, however, is often expensive at least in terms of data collection. Moreover, it is sometimes not possible to gather such data in advance either because there may be simply too many operating speakers and environments, or because they are continuously changing as in telephony applications.

Most conventional unsupervised adaptation techniques use hypotheses generated by the speech recognizers as the adaptation transcriptions. For example, one popular unsupervised adaptation technique using this approach is maximum likelihood linear regression (MLLR). A more detailed discussion of the MLLR technique is presented, for example, in an article by C. Leggetter et al. entitled "Speaker Adaptation of Continuous Density HMMs Using Multivariate Linear Regression," *International Conference on Spoken Language Processing*, pp. 451-454 (1994), which is incorporated herein by reference. The MLLR approach essentially adapts the mean vectors of HMMs by a set of affine transformation matrices to match speaker-specific testing utterances. Another conventional adaptation technique uses a maximum likelihood neural network (MLNN). The MLNN technique is described in detail, for example, in an article by D. Yuk et al. entitled "Adaptation to Environment and Speaker Using Maximum Likelihood Neural Networks," *Eurospeech*, pp. 2531-2534 (September 1999), which is incorporated herein by reference. The MLNN approach can perform a nonlinear transformation of mean vectors and covariance matrices.

Although the MLLR and MLNN techniques show an improvement in many tasks, they are not suitable for incremental online adaptation for at least the following two reasons. First, since they use a set of matrices or complex neural networks as the transformation functions, all the parameters in the functions must be estimated using the adaptation data in an unsupervised manner, which requires relatively large amounts of data and computation time. Second, even after the parameters in the functions are estimated, the adaptation process may be slow because all the mean vectors in the recognizer must be transformed.

SUMMARY OF THE INVENTION

An unsupervised incremental online adaptation technique is provided which rapidly adapts a speech recognizer system to a particular speaker and/or environment as the system is being used. In accordance with the invention, the speech recognizer does not require the adaptation data in advance, nor does the speech recognizer require feedback from its users. Moreover, a speech recognizer system employing an incremental adaptation scheme has an inherent advantageous characteristic of continuous improvement as the system is used longer. The techniques of the present invention eliminate the need for obtaining and utilizing training speech data without suffering any noticeable loss of accuracy, thereby making the present invention well-suited for online adaptation (e.g., telephone communications, etc.).

More specifically, the present invention employs maximum likelihood criteria (e.g., maximum likelihood spectral transformation (MLST)) for rapid speaker and environment adaptation. The inventive techniques described herein are designed to increase the likelihood of testing or real-time utterances after a transformation of speech feature vectors. An important aspect of the invention is that the transformation is done in a linear spectral domain of feature space so that the adaptation process reliably estimates transformation parameters and is computationally inexpensive. The transformation function of the present invention requires relatively few parameters to be estimated, thereby making it possible for a speech recognition system employing the inventive techniques to perform rapid adaptation after only a small amount of data is evaluated. Furthermore, the transformation function of the present invention is capable of handling both convolutional and additive noise.

In accordance with one aspect of the invention, a method for use in a continuous speech recognition system comprises transforming speech feature vectors to match testing or real-time utterances to speech recognizers. The transformation is done in a linear spectral space with few parameters to be estimated as compared to conventional approaches. An approximation of an original maximum likelihood solution is preferably introduced for a more rapid estimation of transformation parameters. A different type of dynamic feature may be used to make the transformation easier, or an approximated transformation may be used instead.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of an illustrative continuous speech recognition system. It is to be understood, however, that the present invention is not limited to this or any particular speech recognition system. In fact, the invention may not be limited to speech applications. Rather, the invention has wide applicability to any suitable pattern recognition system in which it is desirable to realize increased matching performance via improved feature space transformation based adaptation techniques. By way of example only, generalized speech recognition systems such as the commercially available large vocabulary IBM ViaVoice or ViaVoice Gold systems (trademarks of IBM Corporation of Armonk, N.Y.) may be adapted to permit and/or perform feature space transformation in accordance with the present invention.

Figure 1:
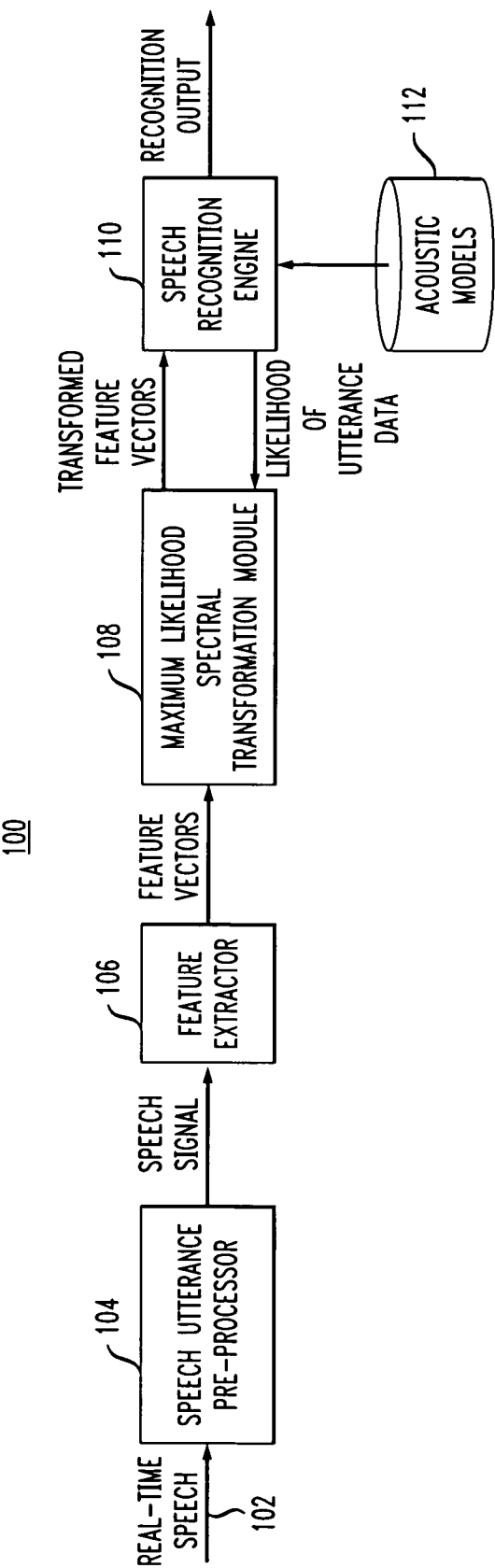
FIG. 1 is a block diagram of an illustrative speech recognition system in a real-time recognition mode of operation, in accordance with one aspect of the present invention.

Referring initially to FIG. 1, a block diagram of an illustrative continuous speech recognition system 100 employing maximum likelihood criteria is shown in a real-time recognition mode, in accordance with the present invention. The system 100 preferably comprises front-end processing components including a speech utterance pre-processor 104 and a feature extractor 106. Additionally, the system 100 comprises a maximum likelihood spectral transformation (MLST) module 108 and a speech recognition engine 110. As depicted in FIG. 1, the speech recognition engine 110 may include memory 112 for storing information, such as, for example, acoustic models, lexicon, or other information utilized by the speech recognition engine during real-time decoding operations.

The speech utterance pre-processor 104 receives speech 102, preferably in the form of testing or real-time utterances, and generates representative speech waveforms (i.e., a speech signal). Speech utterance pre-processor 104 may include, for example, an audio transducer (e.g., a microphone) and a digital-to-analog converter which respectively operatively transforms the received utterance into an analog electrical signal, and then preferably converts the analog signal into a digital signal representation of the received utterance. Further, the speech utterance pre-processor 104 may sample the speech signal at predetermined intervals and partition the signal into overlapping frames so that each frame can be discretely processed by the remainder of the system. The output signal from the speech utterance pre-processor 104 is the sampled speech waveform or speech signal which is preferably recorded and presented to a feature extractor 106.

The feature extractor 106 receives the speech signal and, as is known in the art, extracts cepstral features from the signal at predetermined (e.g., periodic) intervals, such as, for example, every ten milliseconds. The cepstral features are preferably in the form of speech or feature vectors (signals). Feature vectors associated with at least a portion of the real-time speech utterances 102 are output by the feature extractor 106 and passed on to the MLST module 108. As will be described in further detail below, the MLST module 108 operatively transforms these feature vectors, which are then used by the system to decode speech data received during the course of a real-time application.

With continued reference to FIG. 1, the MLST module 108 transforms the feature vectors generated by the feature extractor 106 by applying a function based on maximum likelihood criteria, preferably a maximum likelihood spectral transformation (MLST), such that the likelihood of testing utterances is increased after the transformation. The MLST, according to the invention, is explained in further detail herein below. An important aspect of the present invention is that the MLST is performed in a linear spectral (frequency) domain or space. At least one advantage of transforming the feature vectors in a linear spectral domain is that the speech recognition system can reliably estimate transformation parameters and noise channel effects, without the need for matrices, complex neural networks or the like associated with, for example, conventional logarithmic transformation architectures and techniques. Transformed feature vectors generated by the MLST module 108 are subsequently passed to a speech recognition engine 110 which preferably functions in a conventional manner and produces a recognition output signal.

The speech recognition engine 110 receives the transformed feature vectors and preferably generates data corresponding to the likelihood of an utterance for a given transformation interval. At least a portion of this data may be operatively fed back to the MLST module 108 and later used for parameter estimation and spectral transformation of a feature vector in a subsequent transformation interval.

Maximum Likelihood Spectral Transformation

The difference in characteristics between training speech data and testing or real-time utterances may be approximated as follows:

$$x_i^{(f)} = N_i^{\alpha} \dot{x}_i^{(f)} + N_i^{\beta}, \qquad (1)$$

where $x_i^{(f)}$ is the ith dimension (i.e., ith component of a speech vector) linear spectral value of observed or real-time speech, x, $\dot{x}_i^{(f)}$ is the corresponding value of clean speech, $N_i^{\alpha}$ is convolutional noise, and $N_i^{\beta}$ is additive noise. It is to be appreciated that the term "clean speech" as used herein is intended to refer to a pure speech component, without convolutional noise and/or additive noise components. Equation (1) above may be rearranged by solving for the original clean speech $\dot{x}_i^{(f)}$ as follows:

$$\dot{x}_i^{(f)} = \frac{1}{N_i^{\alpha}} x_i^{(f)} - \frac{N_i^{\beta}}{N_i^{\alpha}}. \qquad (2)$$

In accordance with the invention, a maximum likelihood spectral transformation (MLST) estimates the parameters $N_i^{\alpha}$ and $N_i^{\beta}$, corresponding to convolutional noise and additive noise, respectively, for each dimension i such that the likelihood of testing utterances is increased when $\dot{x}_i^{(f)}$ is used instead of $x_i^{(f)}$ in a linear spectral space. Once transformation parameters $N_i^{\alpha}$ and $N_i^{\beta}$ are estimated, the linear spectra are preferably transformed using equation (2) above. A technique for estimating the transformation parameters $N_i^{\alpha}$ and $N_i^{\beta}$ so as to maximize the likelihood of an utterance is explained in detail below.

Feature Transformation

In order to determine the parameters of a hidden Markov model (HMM), it is generally necessary to make an initial rough estimate as to what the transformation parameters might be. Once this done, more accurate parameters (at least in terms of maximum likelihood) may be found, such as, for example, by applying a Baum-Welch re-estimation algorithm (see, e.g., L. Baum, "An Inequality and Associated Maximization Technique in Statistical Estimation of Probabilistic Functions of a Markov Process," *Inequalities*, Chapter 3, pp. 1-8 (1972), which is incorporated herein by reference) or other suitable technique(s). In the case of HMM-based speech recognizers that use combinations of Gaussian probability density functions (PDF), the likelihood of an utterance can be expressed using the Baum-Welch algorithm as follows:

$$\prod_t \sum_s \sum_g \gamma_{t,s,g} \frac{1}{\sqrt{(2\pi)^n |\Sigma_{s,g}|}} e^{-\frac{1}{2}D(x_t,m_{s,g},\Sigma_{s,g})}, \qquad (3)$$

$$D(x_t, m_{s,g}, \Sigma_{s,g}) = (x_t - m_{s,g})^T \Sigma_{s,g}^{-1} (x_t - m_{s,g}),$$

where $\gamma_{t,s,g}$ represents the probability of a speech vector $x_t$ being in a Gaussian PDF g of a state s, and $m_{s,g}$ and $\Sigma_{s,g}$ represent a mean vector and covariance matrix, respectively, of the Gaussian PDF. It is to be appreciated that the mean vector is from the Gaussian PDF stored in each state.

In accordance with the invention, let $x_t^{(f)}$ be the linear spectrum of a cepstrum, $x_t$, and $\Phi$ be a function that produces the cepstrum, i.e. $x_t = \Phi(x_t^{(f)})$. For simplicity of notation, let A be a diagonal matrix with $A_{ii} = 1/N_i^\alpha$, and $b_i = -N_i^\beta/N_i^\alpha$. The likelihood of an utterance in equation (3) above can be rewritten in terms of the linear spectral values as follows:

$$\prod_t \sum_s \sum_g \gamma_{t,s,g} \frac{1}{\sqrt{(2\pi)^n |\Sigma_{s,g}|}} e^{-\frac{1}{2}D\left(\Phi\left(Ax_t^{(f)}+b\right),m_{s,g},\Sigma_{s,g}\right)}. \qquad (4)$$

This likelihood can be maximized with respect to A and b by conventional numerical iteration methods, as known by those skilled in the art.

In accordance with the invention, a faster approximation is preferably used in order to speed up the parameter estimation process. By using a Viterbi algorithm (see, e.g., G. Forney, "The Viterbi Algorithm," *Proceedings of the IEEE*, Chapter 61, pp. 268-278 (March 1973), which is incorporated herein by reference) rather than the Baum-Welch algorithm, equation (4) above can be simplified for a diagonal covariance matrix case as follows:

$$\prod_t \frac{1}{\sqrt{(2\pi)^n \prod_i v_{t,i}}} e^{-\frac{1}{2}\sum_i \frac{\left(\Phi_i\left(A_{ii}x_{t,i}^{(f)}+b_i\right)-m_{t,i}\right)^2}{v_{t,i}}}, \qquad (5)$$

where $m_{t,i}$ and $v_{t,i}$ are the mean and variance, respectively, of a Gaussian PDF that belongs to a Viterbi path at time t. Instead of seeking numerical iteration solutions to determine the maximum likelihood of an utterance, a least square solution of $A_{ii}x_{t,i}^{(e)}+b_i=m_{t,i}^{(e)}$ is prefera used, where $x_{t,i}^{(e)}$ and $m_{t,i}^{(e)}$ are sub-linear spectral values of a feature vector and mean vector, respectively for the ith component of the speech vector. Since initially there will be no information relating to prior utterances, default initial values of A=1 and b=0 are preferably chosen. Using the above equation of the form Ax+b=m, it can be easily shown that these default values will not effect the first utterance. It is to be appreciated that the exponential sub-linear factor is preferably experimentally chosen to be ⅙ (i.e., $x^{(e)} = \{x^{(f)}\}^{1/6}$) in order to produce a minimized error rate. A closed-form solution in sub-linear space is employed to approximate the original solution involving a logarithmic operation in $\Phi$. The approximated solution is, then, as follows:

$$A_{ii} = \frac{T\sum_t x_{t,i}^{(e)} m_{t,i}^{(e)} - \sum_t x_{t,i}^{(e)} \sum_t m_{t,i}^{(e)}}{T\sum_t x_{t,i}^{(e)2} - \sum_t x_{t,i}^{(e)} \sum_t x_{t,i}^{(e)}}, \qquad (6)$$

$$b_i = \frac{-A_{ii}\sum_t x_{t,i}^{(e)} + \sum_t m_{t,i}^{(e)}}{T}, \qquad (7)$$

where T is an index for time.

When computing the cepstrum, the linear spectral value $x^{t,i(f)}$ can be cached for later use in the parameter estimation and spectral transformation. The corresponding value, $m_{t,i}^{(f)}$, from the mean vector is preferably computed by an inverse process of cepstrum computation; i.e., $m_{t,i}^{(f)} = \Phi^{-1}(m_{t,i})$. To save online computation time, all $m_i^{(f)}$ can be computed in advance, at least temporarily stored and used repeatedly later.

Mean Transformation

The feature transformation may also be done in model space, not merely in feature space. The likelihood of an utterance in terms of linear spectral values of mean vectors can be written as follows:

$$\prod_t \sum_s \sum_g \gamma_{t,s,g} \frac{1}{\sqrt{(2\pi)^n |\Sigma_{s,g}|}} e^{-\frac{1}{2}D\left(x_t,\Phi\left(Cm_{s,g}^{(f)}+d\right),\Sigma_{s,g}\right)}, \qquad (8)$$

where $m_{s,g}^{(f)}$ is a linear spectrum of the cepstral mean vector $m_{s,g}$, C is a diagonal matrix with $C_{ii} = N_i^\alpha$, and $d_i = N_i^\beta$. Using the same approximation as presented in equations (6) and (7) above, an approximated solution can be determined as follows:

$$C_{ii} = \frac{T\sum_t x_{t,i}^{(e)} m_{t,i}^{(e)} - \sum_t x_{t,i}^{(e)} \sum_t m_{t,i}^{(e)}}{T\sum_t m_{t,i}^{(e)2} - \sum_t m_{t,i}^{(e)} \sum_t m_{t,i}^{(e)}}, \qquad (9)$$

$$d_i = \frac{-C_{ii}\sum_t m_{t,i}^{(e)} + \sum_t x_{t,i}^{(e)}}{T}. \qquad (10)$$

Cepstral Mean Normalization and Dynamic Features

Cepstral mean normalization (CMN) is a conventional blind channel equalization technique which is suitable for use with the present invention for handling convolutional noise (see, e.g., S. Furui, "Cepstral Analysis Technique for Automatic Speaker Verification," *IEEE Transactions on Acoustics, Speech and Signal Processing*, ASSP-29(2), pp. 254-272, September 1996, which is incorporated herein by reference). It is to be appreciated that other suitable techniques for further increasing the likelihood of utterances may be similarly employed with the invention. Although the MLST technique of the present invention is capable of handling convolutional noise, MLST can also work effectively with CMN to provide further advantages or otherwise enhance performance. For example, this may be particularly desirable when there is a severe mismatch between training speech data and testing utterances. In such instance, CMN may recover the severe mismatch, at least to some extent, thereby helping to make MLST work more efficiently.

Dynamic features, such as, for example, first and second order time derivatives, are additional sets of vectors appended to the original cepstral vectors used, at least in part, for increasing the accuracy of the acoustic modeling. For the feature transformation MLST, the dynamic features can be computed from the transformed cepstra. In the mean transformation case, since re-computing the dynamic components of the mean vectors essentially involves a more complex calculation, preferably only the static components of the mean vectors are updated.

Figure 2:
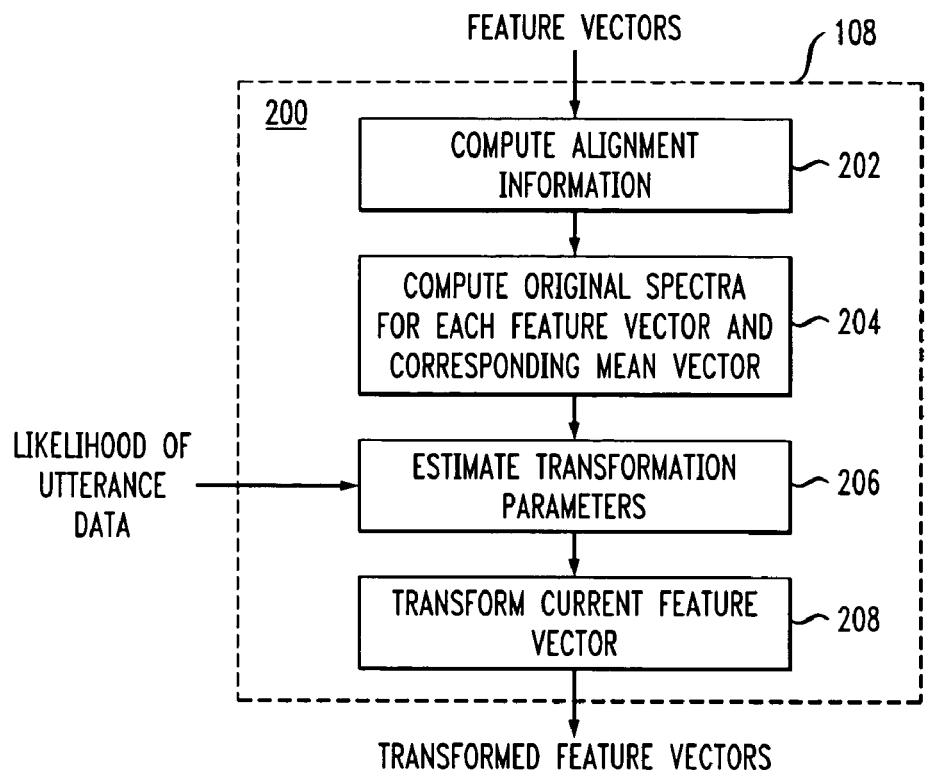
FIG. 2 is a logical flow diagram of an illustrative maximum likelihood spectral transformation method, according to the invention.

FIG. 2 depicts a logical flow diagram of a MLST methodology 200 in accordance with one aspect of the invention. The maximum likelihood transformation methodology described herein is performed in the MLST module 108 of the continuous speech recognition system shown in FIG. 1. As previously discussed, the MLST module 108 receives as input feature vectors associated with a real-time continuous speech signal presented to the speech recognition system and outputs transformed feature vectors to the speech recognition engine (110 in FIG. 1). Additionally, the MLST module 108 receives as input likelihood of utterance data fed back from the speech recognition engine. This likelihood of utterance data is used by one or more functional blocks included in the illustrative MLST methodology 200. For example, the likelihood of utterance data from the speech recognition engine is fed back to block 206 for use in estimating the transformation parameters.

With reference to FIG. 2, feature vectors (e.g., from the feature extractor 106 in FIG. 1) are presented to functional block 202 which computes alignment information between the speech recognition engine and the feature vectors based, at least in part, on likelihood of utterance data from the speech recognition engine. Preferably, the alignment information is computed using a Baum-Welch algorithm, as previously described herein. The alignment information from block 202 is presented to functional block 204 which computes an original spectra for each feature vector and corresponding mean vector. As stated above, the mean vector is obtained from the Gaussian PDF stored in each state. The original spectra is preferably computed from cepstra by performing an exponential operation and inverse Fourier transformation. This is essentially the reverse of cepstra computation.

Based on the original spectra for each feature vector generated by block 204, functional block 206 performs an estimation of the transformation parameters $N_i^\alpha$, representing convolutional noise of the ith component of the speech vector, and $N_i^\beta$, representing additive noise, for example, using the approximations set forth in equations (6) and (7) above. The estimated transformation parameters $A_i$ and $b_i$ from block 206 are subsequently applied in block 208 to compute $y_i = A_i x_i + b_i$, where $y_i$ is the transformed feature vector of the ith component of the speech vector. The transformed feature vector is subsequently presented to the speech recognition engine for further processing and generation of likelihood of utterance information to be fed back to the MLST module 108.

Figure 3:
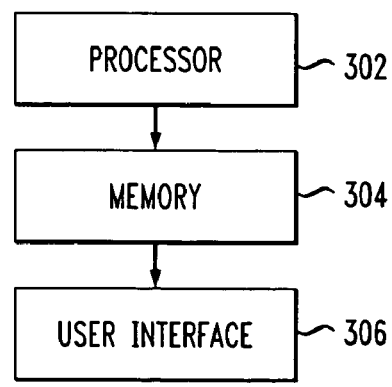
FIG. 3 is a block diagram of an illustrative hardware implementation of a speech recognition system employing maximum likelihood spectral transformation, according to the invention.

Referring now to FIG. 3, a block diagram of an illustrative hardware implementation of a speech recognition system employing maximum likelihood spectral transformation according to the invention (e.g., as depicted in FIGS. 1 and 2) is shown. In this implementation, a processor 302 for controlling and performing feature space transformation and speech decoding is operatively coupled to a memory 304 and a user interface 306. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "user interface" as used herein is intended to include, for example, one or more input devices (e.g., keyboard, mouse, etc.) for entering data to the processor, and/or one or more output devices (e.g., printer, monitor, etc.) for presenting the results associated with the processor. The user interface 306 may also include at least a portion of the speech utterance pre-processor 104 (see FIG. 1), such as, for example, the microphone for receiving user speech.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 302. In any case, it is to be appreciated that the components shown in FIG. 1 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Experimental Results

By way of example only, experimental results are presented, as described herein, at least in part to demonstrate the efficiency of an unsupervised adaptation technique using maximum likelihood criteria in accordance with the present invention. The efficiency of the methodologies of the invention is tested on telephone speech data from a speaker-phone. An unsupervised incremental online adaptation scheme using MLST has been incorporated into a speech recognition system. A baseline speech recognition system was fashioned using handset telephone speech data. Testing utterances were collected using stereo channels, one channel being used for the handset and the other channel being used for the speaker-phone. A test set of speakers was employed including ten females and ten males. Each subject spoke forty utterances of digit strings. The baseline system shows a 7.6 percent sentence error rate on the handset speech data. When the system is exposed to speaker-phone data that is contaminated by channel difference and background noise, the error rate increases to 28.1 percent.

Adaptation Modes

The adaptation has been done in each of several different modes, as described below, to evaluate the MLST technique of the invention.

Environment adaptation: The testing utterances are arranged such that no same speaker's utterances may be found in any set of twenty consecutive utterances. A parameter estimation process is re-initialized every twenty utterances so that each utterance is decoded using the transformation function estimated from the utterances of other speakers (i.e., using a speaker independent transformation function).

Two-pass decoding: For each utterance, transformation parameters are estimated using a first pass decoding, and the utterance is decoded again using the transformed feature vectors. This process of parameter estimation and decoding can be repeated as many as necessary. For this experiment, only one iteration is used.

Speaker adaptation: Utterances belonging to a particular speaker are grouped together, and a parameter estimation process is re-initialized at each speaker boundary (i.e., for each new speaker). In this mode of operation, the n-th utterance of a speaker is transformed by a parameter set estimated from the n−1 previous utterances that belong to the same speaker. This is the most natural and efficient way of doing the adaptation in telephone speech recognition because speaker boundary information is available most of the time.

Figures 4, 5:
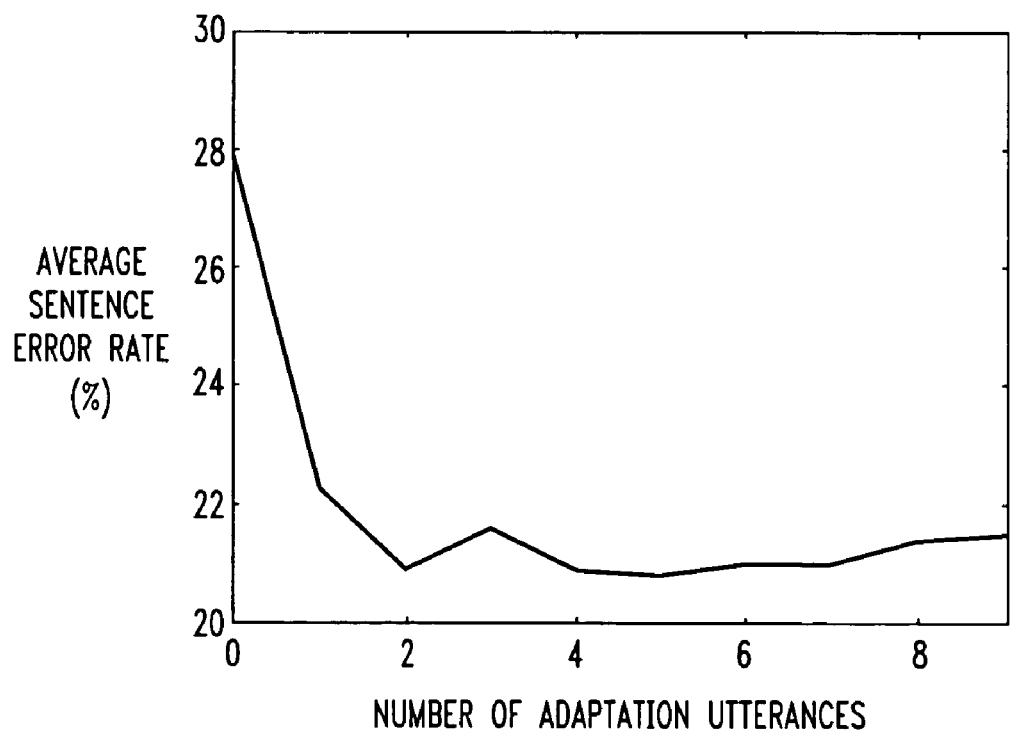
FIGS. 4 and 5 are diagrams illustrating experimental results associated with comparisons between a baseline system and a maximum likelihood spectral transformation-based system using environmental adaptation, two-pass decoding and speaker adaptation, according to one aspect of the present invention.

Referring now to FIG. 4, the performance of the MLST technique of the present invention is shown in the various operating modes described above. As shown in FIG. 3, the error rate is decreased by 5.3 percent in a blind environment adaptation mode. Since the data from a pool of speakers is used to estimate the transformation parameters, it has an averaging effect, which results in environment adaptation (i.e., transformation from handset speech to speaker-phone speech data). In the two-pass mode, the error rate is reduced by 20.6 percent compared to the baseline system. This mode of operation is appropriate when speaker boundary information is not available. However, the two-pass mode increases decoding time by the factor of two. The greatest reduction in error rate, namely, 29.5 percent, is obtained by employing a speaker adaptation mode, wherein all previously decoded utterances that belong to a same speaker are used. Since the statistics of those utterances are accumulated, the computation is not repeated and memory is efficiently utilized.

An important issue involving incremental online adaptation relates to the time it takes for the system to adapt to a new speaker or environment. FIG. 5 illustrates the effect of the number of utterances used for the adaptation compared to error rate, in accordance with the invention. In this experiment, the same testing set is decoded forty times, each with a different order of utterances presented to the recognizer, and the error rates are averaged over these forty trials. As illustrated in FIG. 5, in a digit string recognition task, the system of the present invention successfully adapts and stabilizes after only two utterances. Each utterance in the test contains an average of ten words.

Cepstral Mean Normalization (CMN) and Silence

In the feature transformation case, a cepstral mean normalization (CMN) technique can be applied twice; once before the transformation, and the once after the transformation. It is to be appreciated, however, that the latter transformation is not necessary because it is subsumed by the MLST. Experimentally, it has been confirmed that CMN does not noticeably improve accuracy (e.g., decrease the error rate) and therefore this additional technique is not described herein. It has also been observed that the transformation parameters can be more reliably estimated by removing a silence portion of an utterance. However, since the baseline system does not distinguish silence from noise, the entire portion of an utterance is used for the parameter estimation.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of transforming speech feature vectors associated with speech data provided to a speech recognition system, the method comprising the steps of:

receiving likelihood of utterance information corresponding to a previous feature vector transformation;

estimating one or more transformation parameters as a function of the likelihood of utterance information corresponding to a previous feature vector transformation; and transforming a current feature vector based on at least one of maximum likelihood criteria and the estimated one or more transformation parameters, the transformation being performed in a linear spectral domain;

wherein the step of estimating the one or more transformation parameters comprises the step of estimating convolutional noise $N_i^\alpha$ and additive noise $N_i^\beta$ for each ith component of a speech vector corresponding to the speech data provided to the speech recognition system.

2. The method of claim 1, wherein the step of transforming the current feature vector is performed in feature space.

3. The method of claim 1, wherein the step of transforming the current feature vector is performed in model space.

4. The method of claim 1, wherein the maximum likelihood criteria is a maximum likelihood spectral transformation (MLST).

5. The method of claim 1, wherein the step of transforming the current feature vector further comprises the step of determining $$\hat{x}_i^{(f)} = \frac{1}{N_i^\alpha} x_i^{(f)} - \frac{N_i^\beta}{N_i^\alpha},$$

where $x_i^{(f)}$ is an ith component of a speech vector corresponding to the speech data provided to the speech recognition system, $N_i^\alpha$ is convolutional noise and $N_i^\beta$ is additive noise of the ith component of the speech vector.

6. The method of claim 1, wherein the step of estimating the one or more transformation parameters further comprises the step of defining a diagonal matrix A with $A_{ii}=1/N_i^\alpha$, and defining $b_i=-N_i^\beta/N_i^\alpha$.

7. The method of claim 6, further comprising the steps of:

determining $A_{ii}$ in accordance with an expression $$A_{ii} = \frac{T\Sigma_t x_{t,i}^{(e)} m_{t,i}^{(e)} - \Sigma_t x_{t,i}^{(e)} \Sigma_t m_{t,i}^{(e)}}{T\Sigma_t x_{t,i}^{(e)2} - \Sigma_t x_{t,i}^{(e)} \Sigma_t x_{t,i}^{(e)}};$$

and
determining $b_i$ in accordance with an expression $$b_i = \frac{-A_{ii}\Sigma_t x_{t,i}^{(e)} + \Sigma_t m_{t,i}^{(e)}}{T};$$

where $x_{t,i}^{(e)}$ and $m_{t,i}^{(e)}$ are sub-linear spectral values of a feature vector and corresponding mean vector, respectively, for each ith component of the speech vector.

8. An article of manufacture for transforming speech feature vectors associated with speech data provided to a speech recognition system, comprising a machine readable medium containing one or more programs which when executed implement the steps of:

receiving likelihood of utterance information corresponding to a previous feature vector transformation;

estimating one or more transformation parameters as a function of the likelihood of utterance information corresponding to a previous feature vector transformation; and transforming a current feature vector based on at least one of maximum likelihood criteria and the estimated transformation parameters, the transformation being performed in a linear spectral domain;

wherein the step of estimating the one or more transformation parameters comprises the step of estimating convolutional noise $N_i^\alpha$ and additive noise $N_i^\beta$ for each ith component of a speech vector corresponding to the speech data provided to the speech recognition system.

9. The article of claim 8, wherein the step of transforming the current feature vector is performed in a feature space.

10. The article of claim 8, wherein the step of transforming the current feature vector is performed in a model space.

11. The article of claim 8, wherein the maximum likelihood criteria is a maximum likelihood spectral transformation (MLST).

12. The article of claim 8, wherein the step of transforming the current feature vector includes the step of determining $$\hat{x}_i^{(f)} = \frac{1}{N_i^\alpha} x_i^{(f)} - \frac{N_i^\beta}{N_i^\alpha},$$

where $x_i^{(f)}$ is an ith component of a speech vector corresponding to the speech data provided to the speech recognition system, $N_i^\alpha$ is convolutional noise and $N_i^\beta$ is additive noise of the ith component of the speech vector.

13. The article of claim 8, wherein the step of estimating the one or more transformation parameters further includes the step of defining a diagonal matrix A with $A_{ii}=1/N_i^\alpha$, and defining $b_i=-N_i^\beta/N_i^\alpha$.

14. The article of claim 13, wherein the step of estimating the one or more transformation parameters further comprises the steps of:

determining $A_{ii}$ in accordance with an expression $$A_{ii} = \frac{T\Sigma_t x_{t,i}^{(e)} m_{t,i}^{(e)} - \Sigma_t x_{t,i}^{(e)} \Sigma_t m_{t,i}^{(e)}}{T\Sigma_t x_{t,i}^{(e)2} - \Sigma_t x_{t,i}^{(e)} \Sigma_t x_{t,i}^{(e)}};$$

and
determining $b_i$ in accordance with an expression $$b_i = \frac{-A_{ii}\Sigma_t x_{t,i}^{(e)} \Sigma_t m_{t,i}^{(e)}}{T};$$

where $x_{t,i}^{(e)}$ and $m^{t,i(e)}$ are sub-linear spectral values of a feature vector and corresponding mean vector, respectively, for each ith component of the speech vector.

15. Apparatus for transforming speech feature vectors associated with speech data provided to a speech recognition system, the apparatus comprising:

at least one processing device operative: (i) to receive likelihood of utterance information corresponding to a previous feature vector transformation; (ii) to estimate one or more transformation parameters based, at least in part, on the likelihood of utterance information corresponding to a previous feature vector transformation; (iii) to transform a current feature vector based on at least one of maximum likelihood criteria and the estimated transformation parameters, the transformation being performed in a linear spectral domain; and (iv) to estimate convolutional noise $N_i^\alpha$ and additive noise $N_i^\beta$ for each ith component of a speech vector corresponding to the speech data provided to the speech recognition system.

* * * * *